United States Patent [19]
Geiger et al.

[11] Patent Number: 5,284,318
[45] Date of Patent: Feb. 8, 1994

[54] FLUID CONNECTION AND CONTROL DEVICE FOR FLUID MACHINES

[75] Inventors: Robert E. Geiger; John M. Clapp, both of Sayre, Pa.

[73] Assignee: Ingersoll-Rand Company, Woodcliff Lake, N.J.

[21] Appl. No.: 954,716

[22] Filed: Sep. 30, 1992

Related U.S. Application Data

[63] Continuation-in-part of Ser. No. 809,109, Dec. 13, 1991, Pat. No. 5,197,711, which is a continuation-in-part of Ser. No. 723,770, Jul. 1, 1991, abandoned.

[51] Int. Cl.⁵ .............................................. F16K 51/00
[52] U.S. Cl. .................................. 251/152; 251/363; 137/580; 285/272; 285/921
[58] Field of Search .................. 285/272, 921; 137/580; 251/363, 148, 152

[56] References Cited

U.S. PATENT DOCUMENTS

| | | | |
|---|---|---|---|
| 2,377,115 | 5/1945 | Van Der Werff | 137/596.2 |
| 2,615,755 | 10/1952 | Crawford | 285/272 |
| 4,111,464 | 9/1978 | Asano et al. | 285/921 |
| 4,239,083 | 12/1980 | Silberman et al. | 285/272 |
| 4,524,807 | 6/1985 | Toliusis | 285/921 |
| 4,823,835 | 4/1989 | Chu | 137/580 |
| 5,197,711 | 5/1991 | Geiger et al. | 251/152 |

*Primary Examiner*—A. Michael Chambers
*Attorney, Agent, or Firm*—Walter C. Vliet; Robert F. Palermo

[57] ABSTRACT

A fluid connection and control device for fluid machines permits fluid inlet or outlet connections without the necessity for threaded connection to the machine. This is accomplished by an elongate radially symmetrical body having first and second ends and a central axial fluid passage connecting the ends. The body is appropriately sized for the fluid channel of the fluid machine and has a provision at the first end for attachment of a flexible hose. The second end has a provision for a fluid tight seal between the body and the fluid channel as well as a mechanism by which the body is retained within the fluid channel of the fluid machine while permitting rotation thereof. Options are provided for incorporation of a valve mechanism for controlling the fluid flow. This provides the advantages of rapid assembly and avoidance of undue stresses to the fluid machine housing.

12 Claims, 2 Drawing Sheets

FLUID CONNECTION AND CONTROL DEVICE FOR FLUID MACHINES

This application is a continuation-in-part of application Ser. No. 07/809,109, filed Dec. 13, 1991, now U.S. Pat. No. 5,197,711 issued Mar. 30, 1993 which is a continuation-in-part of application Ser. No. 07/723,770, filed Jul. 1, 1991 now abandoned.

BACKGROUND OF THE INVENTION

This invention relates generally to fluid machines and more particularly to devices for connecting and controlling fluid conduits for fluid machines.

Fluid machines commonly require connection to fluid inlet and/or fluid outlet lines. Such connections are usually accomplished by use of threaded adapters or bayonet style quick connectors. In either case, an adapter of some sort is threaded into the fluid machine while a mating adapter is attached to the appropriate fluid carrying hose or other conduit.

Where mobility is required, as in the case of fluid powered hand held tools, or in cases where the connection point to the fluid machine is fragile, use of threaded adapters may not be desirable. Such adapters usually extend a significant distance from the attachment point and, consequently, may seriously impair mobility or may even lead to fractures of the fluid machine housing at the attachment point. Consequently, when a fluid machine is made from a thin material or low strength material, the housing will be subject to damage from bumping the adapter or from overtightening of the threaded adapter within the housing fluid channel. Thus, damage to the fluid machine housing at the connection point may be caused by inadvertent physical impact during use, or by routine assembly and disassembly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a fluid connection device for a fluid machine having an elongated radially symmetrical body with first and second ends and a central axial fluid passage connecting the ends. The first end has provision for attachment of a flexible fluid carrying hose, while the second end provides for a circumferential fluid tight seal between the body and a fluid channel of the fluid machine. Between the first and second ends, a retention mechanism is arranged to capture the body and allow for its rotation within the fluid channel.

The foregoing and other aspects will become apparent from the following detailed description of the invention when considered in conjunction with the accompanying drawing figures.

DETAILED DESCRIPTION

Figure 1:
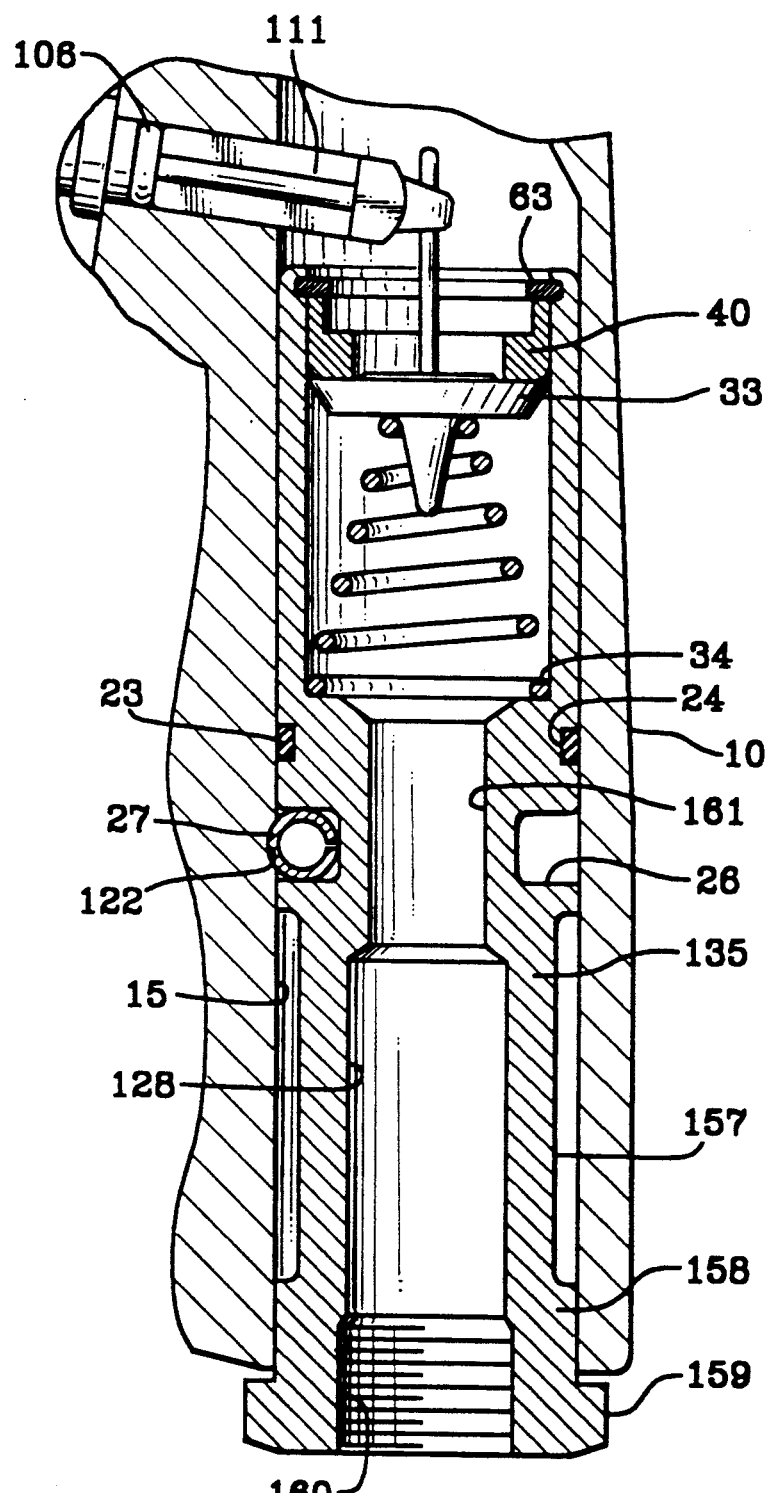
FIG. 1 is a fragmentary partial sectional schematic view of a preferred embodiment of the fluid connection and control device of the present invention for connection to a standard hose fitting.

Referring to FIG. 1, the features of the fluid connection device are readily understood. A fluid machine housing 10 has a fluid channel 15 through which fluid flows either into or out of the fluid machine. The device has a radially symmetrical body 135 with a central axial fluid passage 128, connecting a threaded hose connector 160 at the first end to a sealing arrangement with the fluid channel 15 at the second end. A circumferential seal ring groove 24 on the body 135 provides retention and support for seal ring 23 which provides a fluid tight seal between the outer circumference of the body 135 and the inner wall of fluid channel 15. To capture the body 135 within the fluid channel 15 of housing 10, a retaining pin groove 26 is provided at an intermediate portion of the circumference of body 135. Housing 10 has a retaining pin bore transverse to and tangential with fluid channel 15. Alignment of retaining pin groove 26 with the retaining pin bore permits insertion of retaining pin 27 which cooperates with a semi-circular depression 122 in the housing 10 to capture body 135 and allows for its rotation within fluid channel 15.

The advantages provided by this combination control device and fluid connection device can be readily appreciated with reference to the drawing.

This arrangement provides fluid shutoff even when the fitting body is removed from the housing, and is the preferred embodiment. The body 135 incorporates a valve seat 40 which is held in place by valve seat retainer 63. Valve element 33, shown here as a common tilt valve, occludes the fluid passage through valve seat 40. Valve spring 34 biases valve element 33 against seat 40. The embodiment presented approximates the arrangement that would be seen in the pistol grip handle of a power tool.

The fitting body 135 is provided with a spool extension 157 which substantially elongates the fitting body while minimizing weight addition. The bottom portion of the spool extension 157 is provided with a bore boss 158 which cooperates with the fluid channel or bore 15 as a guide and for the fitting body in the fluid channel 15.

The bore boss 158 in conjunction with an external boss 15 also provide substantial reinforcing material in which a threaded connection 160 may be formed to accept a standard hose fitting where this is desirable or dictated by industry practice. The external boss 159 may be formed on its external surface in a conventional hexagonal nut form to serve as a backup for threading and tightening a standard hose fitting into the threaded connection 160.

The fitting body 135 is further provided with a reduced section of fluid passage in the area of the retainer 27 to accommodate the retainer 27 and its mounting groove 26 without unacceptable loss of structural strength in this area. The combination of bosses 158, 159, and contact of the fitting body 135 in the fluid channel 15 form an extended cantilever structure suitable for withstanding external forces produced on the threaded connection by the standard hose fitting thereby minimizing stress concentrations in the housing 10 again making the connection suitable for use where the machine is made from a more resilient material. Where such is the case the fitting body 135 may be manufactured from a structurally different material such as metal in a unitary piece which is readily assembled and manufactured.

Figure 2:
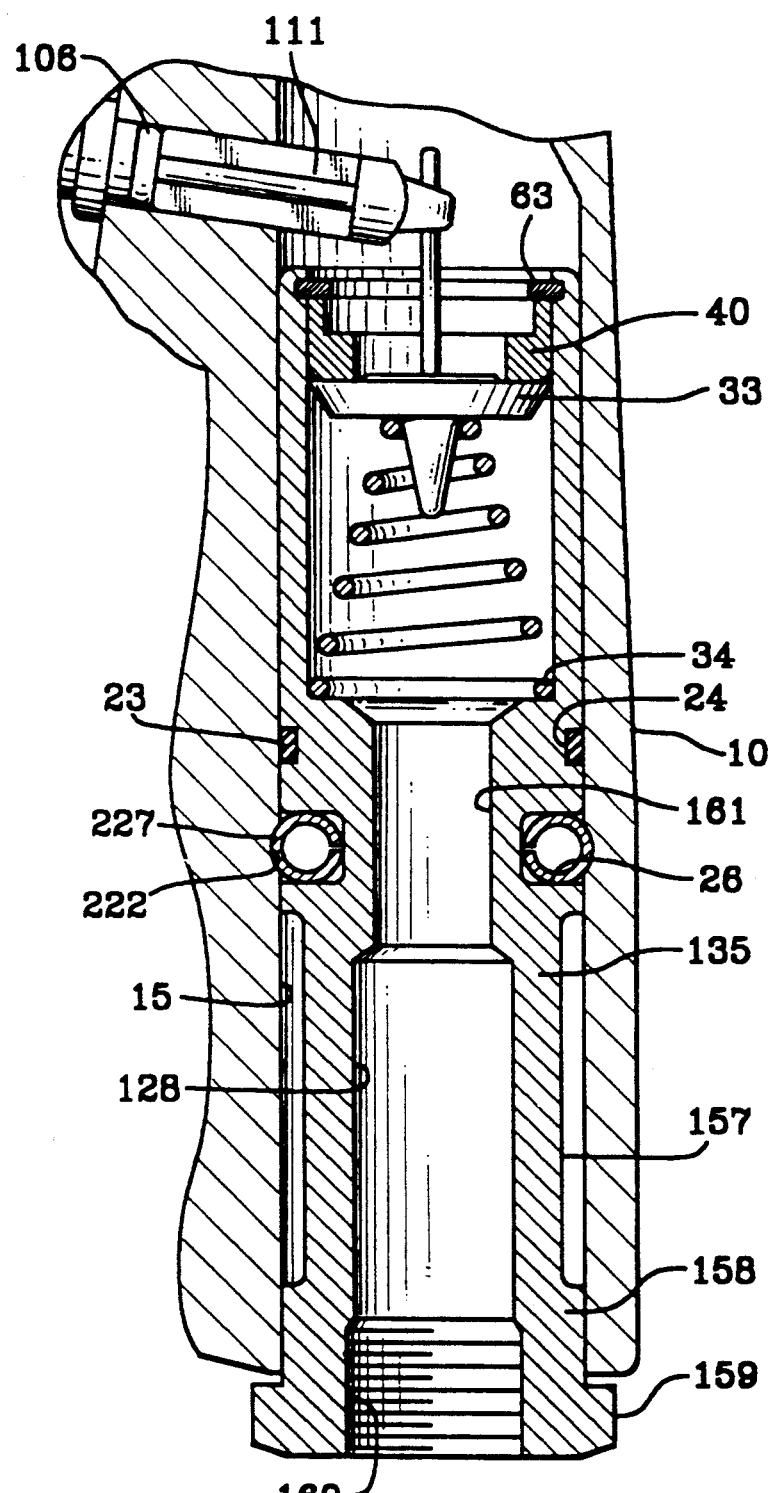
FIG. 2 is the same as FIG. 1 except for retention by a retaining ring.

As seen in FIG. 2, as an alternative to the retaining pin 27, it may be desirable to utilize a spring retaining ring 227 in groove 26 which would cooperate with a semi-circular circumferential groove 222 located in the area of the semi-circular depression 122. In this case the body 135 may be assembled simply by pushing it into the fluid channel 15.

This invention has been described and shown in a preferred embodiment. From this it is clear that the invention provides the advantages of easy assembly and disassembly as well as reducing stress experienced by the housing.

What is claimed is:

1. A fluid hose connection device for a portable pressure fluid operated machine, comprising:
   an elongated radially symmetrical body having first and second ends and a central axial fluid passage therebetween;
   means at the first end for attachment of said body to a flexible hose;
   means at the second end for providing a circumferential fluid tight seal between said body and a fluid channel of said fluid operated machine;
   non-threaded means intermediate of said first and second ends for retaining said body and permitting rotation thereof in said fluid channel; and
   means for supporting said body fully within said fluid channel while permitting only axial rotation of said body.

2. The fluid connection device of claim 1, wherein the means for retaining said body in said fluid channel comprises and external circumferential recess on said body, a transverse bore tangentially intersecting said fluid channel, and an elongate member extending through said transverse bore and said transverse recess.

3. The fluid connection device of claim 1, further comprising:
   means at the second end of said body for selectively permitting o preventing flow of fluid therethrough.

4. The fluid connection device of claim 3, wherein the means for selectively permitting or preventing flow of fluid comprises a valve seat within said central axial fluid passage, a valve element biased against said valve seat to prevent flow of fluid therethrough, and means for selectively displacing said valve element away from said valve seat to permit flow of fluid therethrough.

5. A fluid inlet connection and control device for a portable apparatus having a fluid powered motor within a housing and a pressure fluid channel for communicating pressure fluid from outside said housing to said motor, comprising:
   an elongated fitting assembly having a central axial fluid passage connecting first and second ends thereof;
   means at said first end for connecting said fitting assembly to a fluid inlet hose;
   means at said second end for biasing a valve element against a valve seat to prevent fluid flow into said fluid powered motor;
   means for capturing said fitting assembly for rotation fully supported within a fluid flow channel of said portable apparatus;
   means for providing a fluid tight seal between said fitting assembly and said fluid flow channel of the apparatus; and
   means for selectively displacing said valve element counter to said bias to permit fluid flow from said fluid inlet hose, through said fluid flow channel and into said fluid powered motor.

6. The fluid inlet connection and control device of claim 5, wherein the valve seat, the valve element, and the biasing means for said valve element are contained within the fitting assembly.

7. A fluid inlet connection and control device according to claim 5, wherein said means for connecting said fitting assembly to a fluid inlet hose comprises a threaded connection for a threaded hose assembly.

8. A fluid inlet connection and control device according to claim 7, wherein said threaded connection is made in a boss at said first end which cooperates with said fluid passage to distribute stress loading on said threaded connection from said hose to said housing through a cantilevered structure of said fitting assembly in said fluid passage.

9. A fluid inlet connection and control device according to claim 8, wherein said fitting assembly is provided with a spool length substantially in excess of its diameter to increase the overall effectiveness of said cantilevered structure to distribute said stress loading to said fluid passage.

10. A fluid inlet connection and control device according to claim 7, wherein said fitting assembly is cylindrical and is readily inserted in a complimentary cylindrical bore forming said fluid channel for ease of assembly.

11. A fluid inlet connection and control device according to claim 10, wherein said fitting assembly is secured in said cylindrical bore by a retaining pin.

12. A fluid inlet connection and control device according to claim 10, wherein said fitting assembly is secured in said cylindrical bore by a retaining ring.

* * * * *